United States Patent
Sanada et al.

(10) Patent No.: US 6,778,147 B2
(45) Date of Patent: Aug. 17, 2004

(54) ANTENNA APPARATUS (75) Inventors: Yukitoshi Sanada, Tokyo (JP); Ryuji Kohno, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/351,279

(22) Filed: Jan. 23, 2003

(65) Prior Publication Data

US 2003/0227408 A1 Dec. 11, 2003

(30) Foreign Application Priority Data

Jan. 23, 2002 (JP) ..................................... P2002-014149

(51) Int. Cl.[7] .............................................. H01Q 21/00
(52) U.S. Cl. ........................ 343/853; 342/174; 370/248; 370/249
(58) Field of Search ................................ 343/850, 853, 343/703, 174, 165, 372; 370/248, 249

(56) References Cited

U.S. PATENT DOCUMENTS 5,754,560 A * 5/1998 Nousiainen et al. ......... 714/716
5,940,032 A * 8/1999 Passmann et al. .......... 342/372

* cited by examiner

Primary Examiner—Hoang V. Nguyen
(74) Attorney, Agent, or Firm—Wolf, Greenfield & Sacks, P.C.

(57) ABSTRACT

To realize an antenna apparatus capable of measuring a calibration factor accurately and further, capable of estimating an arrival direction of a received signal by composing a calibration circuit by using a directional coupler. The antenna system includes L-number of branch units, a calibration circuit and an operating unit. Each directional coupler composing the calibration circuit is structured symmetrically. Measuring the received signals $Y_{ti,i-1}$ and $Y_{ti,i+1}$ of i–1th and i+1th receivers, respectively, when an ith transmitter transmits a signal, on the basis of the first branch unit, the operating unit calculates a calibration factor at the ith branch unit as $H_i = T_1 R_i/(T_i R_1) = Y_{t12} Y_{t23} - Y_{ti-1,i}/Y_{t21} Y_{t32} - Y_{ti,i-1}$.

6 Claims, 7 Drawing Sheets

ANTENNA APPARATUS

The present document is based on Japanese Priority Document JP2002-014149, filed in the Japanese Patent Office on Jan. 23, 2002, the entire contents of which being incorporated herein by reference.

BACKGROUND OF THE INVENTION

1. Field of the Invention

The present invention relates to an antenna apparatus including an array antenna used in a time division multiple communication system and its signal calibration circuit and particularly to an antenna apparatus capable of calibrating an amplitude of a transmission/reception signal of each antenna element and a phase thereof without having to depend on the outside information.

2. Description of Related Art

In a time division multiple communication system using an array antenna, signals are send to each antenna element during transmission. However, even if the same signals are send to each antenna element, errors are generated in an amplitude and a phase of the signal to be emitted by each antenna element according to variations of a gain characteristic of an amplification circuit for amplifying the output of a transmitter (a transfer function), and an amplitude characteristic and a phase characteristic of a cable for propagating a signal, a filter for controlling a frequency component of the signal and an antenna element. Due to these errors, the control of a transmission beam pattern becomes difficult, so that beam forming can not be correctly realized.

In addition, also during reception, the similar problems may occur. When a signal arrives at each receiver, an output signal of the receiver has errors in the amplitude and the phase of the signal received by each antenna element depending on variations of a filter characteristic, a gain characteristic of the amplification circuit, and further, a character of a cable for propagating the received signal or the like. Thus, there may be a problem such that a direction of arrival (DOA) of the received signal can not be correctly estimated or the like.

Therefore, in an antenna apparatus using the array antenna, a measure is taken that a calibration circuit is provided to obtain a calibration factor for correcting the error of each transmitter-receiver.

Figure 6:
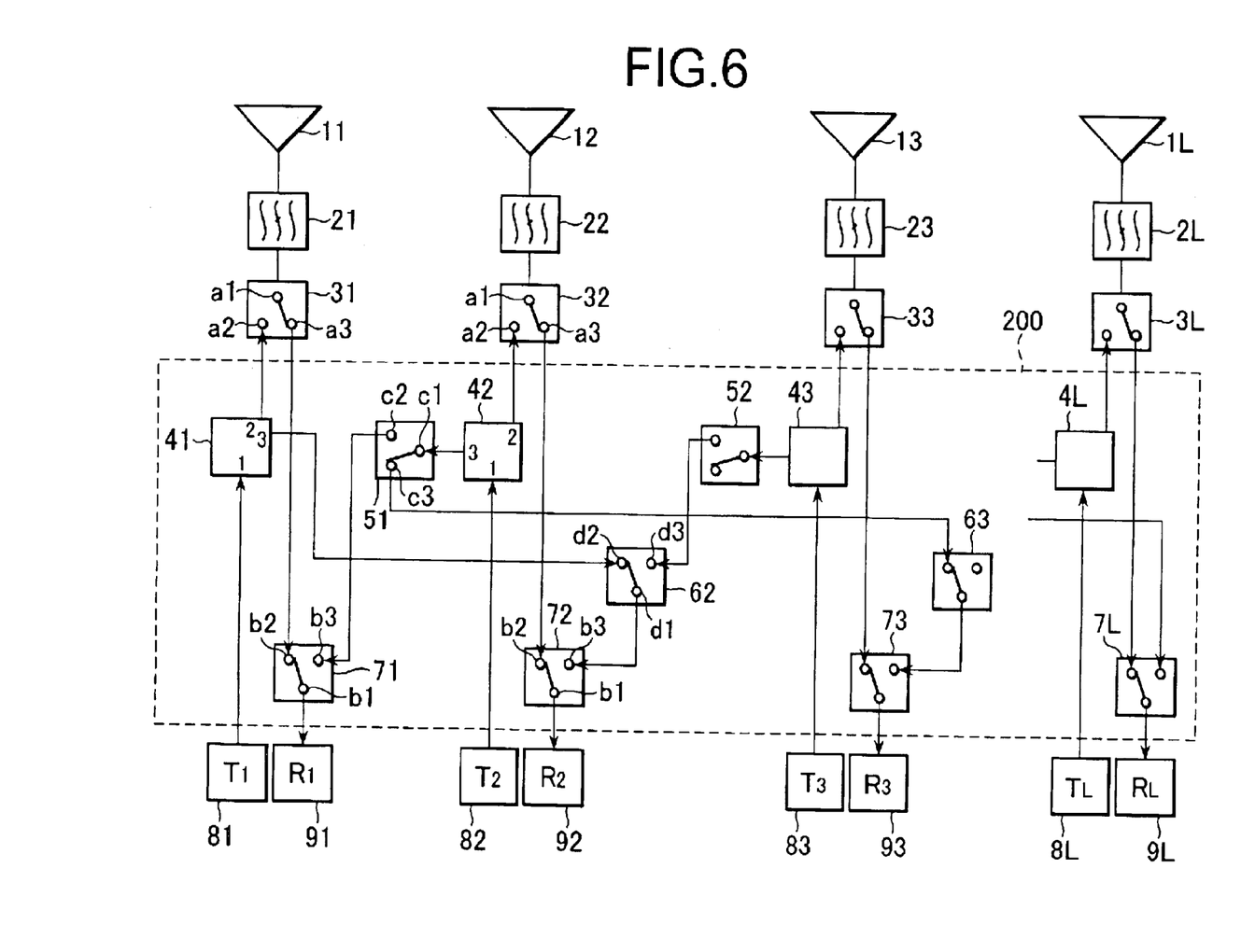
FIG. 6 is a circuit diagram for illustrating an configuration example of a conventional antenna apparatus.

FIG. 6 is a configuration example of an entire antenna system including a conventional calibration circuit. As shown in the drawing, this antenna apparatus is constructed of an antenna array including antenna elements 11, 12, 13-1L, filters 21, 22, 23-2L connected to each antenna element, antenna switches 31, 32, 33-3L connected to each filter, a calibration circuit 200, transmitters 81, 82, 83-8L and receivers 91, 92, 93-9L.

The calibration circuit 200 is constructed of directional couplers 41, 42, 43-4L and SPDT (single pole double through) RF switches (hereinafter, as a matter of convenience, simply referred to as a RF switch) 51, 52, 53-5L-1, 62, 63-6L-1, 71, 72, 73-7L.

The directional couplers 41, 42-4L output the inputted signals to other output terminals with a predetermined amplitude attenuation rate and a predetermined phase difference.

The antenna switch has three terminals and is capable of switching between the transmitting signal and the received signal. For example, the antenna switch 31 has terminals a1, a2 and a3, and the terminals a1 and a2 are connected during transmission so that a signal is sent from the directional coupler 41 to a filter 21. In addition, during reception, the terminal a1 is connected to the terminal a3, so that the received signal from the filter 21 is sent to the directional coupler 41.

In addition, each RF switch also has three terminals, respectively. For example, the RF switch 71 has terminals b1, b2 and b3. The terminal b1 is connected to the terminal b2 during the reception and the terminal b1 is connected to the terminal b3 during calibration.

During the normal transmission, the signal to be sent from the transmitter 81 is inputted to the terminal a2 of the antenna switch 31 through the directional coupler 41. In this time, since the terminal a2 is connected to the terminal a1 in the antenna switch, the signal is inputted to the filter 21. Then, a signal component that passed through the filter 21 is transmitted to the antenna element 11, and emitted in the air.

In addition, in the same way, the signal to be sent from the other transmitter 82, 83-8L are transferred to the antenna elements 12, 13-1L, respectively, to be emitted in the air from each antenna element. During the transmission, by controlling the phase of the signal to be transmitted to each antenna element, a predefined beam pattern is formed, namely, a so-called beam forming can be realized.

The beam forming during the transmission can be realized, for example, by outputting a signal to each antenna element, in which the signals from the transmitters 81, 82, 83-8L are multiplied by predefined weighting factors for controlling an amplitude and a phase, respectively. In addition, the weighting processing, which multiplies the transmitting signal by this weighting factor, can also be realized, for example, by a multiplier provided between the antenna element and the filter, or between the filter and the antenna switch.

During the normal reception, the signal received by the antenna element 11 is transmitted to the filter 21 and then, the signal component that passed through the filter 21 is inputted to the terminal a1 of the antenna switch 31. In this time, since the terminal a1 is connected to the terminal a3 in the antenna switch 31, and then the received signal is transmitted to the terminal b2 of the RF switch 71. The terminal b2 is connected to the terminal b1 in the RF switch 71, so that the received signal is inputted to the receiver 91. Further, in the same way, the received signals of the other antenna elements 12, 13-L1 are transferred to the receivers 92, 93-9L, respectively.

In addition, not only during the transmission but also during the reception, by way of multiplying the received signal from each antenna element by a predefined weighing factor, respectively, the beam forming can be realized. Further, by way of measuring the received signal while sweeping the received beam during the reception, it is also possible to estimate an arrival direction of the received signal.

According to the above described antenna apparatus, when calibrating the device, on the basis of a transmitter and a receiver, it is possible to obtain the calibration factors of respective transmitters and receivers by measuring the amplitudes changes and the phase changes of the transmitting signals and the received signals of the other transmitters and receivers with respect to the above mentioned reference transmitter and receiver.

Figure 7:
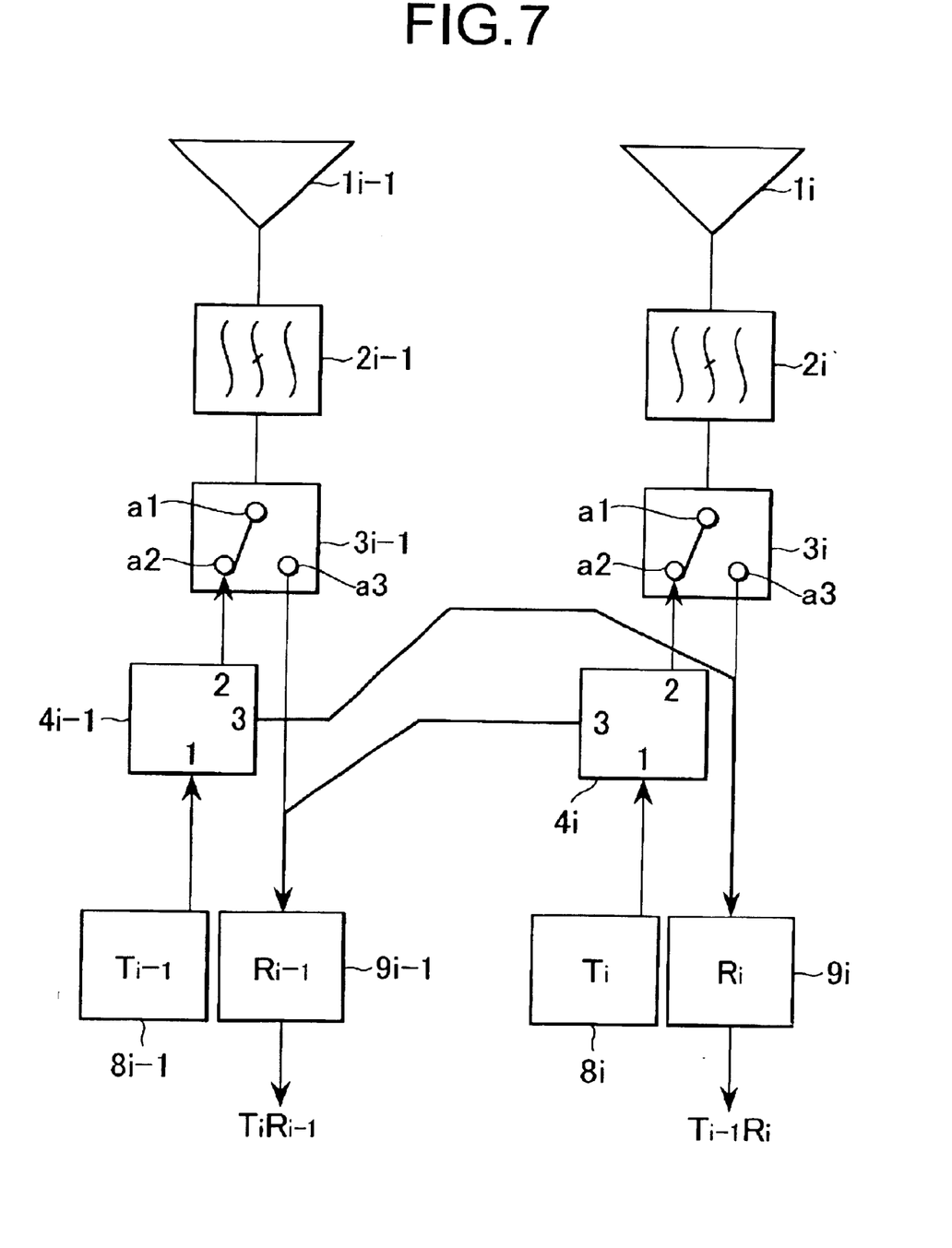
FIG. 7 is a conceptual diagram for showing a flow of a signal when measuring the calibration factor in the conventional antenna apparatus.

With reference to FIG. 7, a method of the calibration in the antenna apparatus shown in FIG. 6 will be described below.

FIG. 7 is a conceptual diagram for showing a flow of a signal when calibrating the antenna apparatus. In FIG. 7, a transmission/reception set including a transmitter 8i-1 (i=2, 3-L) and a receiver 9i-1 and a transmission/reception set including a transmitter 8i and a receiver 9i are depicted.

As shown in FIG. 7, the calibration for the transmitter 8i and the receiver 9i is carried out by measuring a received signal $T_{i-1} R_i$ of the receiver $9i$ when transmitting a signal from the transmitter $8i-1$ and by measuring a received signal $T_i R_{i-1}$ of the receiver $9i-1$ when transmitting a signal from the transmitter $8i$.

A principle of the calibration and how to obtain the calibration factor will be described below.

According to the antenna apparatus shown in FIG. 6, in the receivers 91 to 9L, the optimum weighting factors are defined as $W_{01}$ to $W_{0L}$, such that there is no amplitude difference and no phase difference between the received signals $r_1$ to $r_L$. The output $Y_{ri}$ of the receiver $9i$ is represented as follows.

[Equation 1]

$$Y_{ri} = W_{0i} S_{ri} = W_i M_i R_i S_{ri} \quad (1)$$

In the equation (1), $S_{ri}$ represents a received signal of the antenna element $1i$ and $W_i$ represents a weighting factor that is appropriately used for the received signal during the reception. Further, this weighting factor $W_1$ is multiplied by the received signal in analog or in digital at inside or outside of each receiver. In addition, $M_i$ represents a complex number of a coefficient showing the amplitude change and the phase difference, which are generated in the antenna, the filter and a cable on a path for propagating the signal from the antenna element to the receiver $9i$.

On the other hand, if a signal to be transmitted from the transmitter $8i$ is defined as $S_{ti}$, a signal $y_{ti}$ that was emitted from the antenna element $1i$ in the air after controlling the directionality can be calculated on the basis of the following equation.

[Equation 2]

$$Y_{ti} = W_i M_i T_i S_{ti} \quad (2)$$

In the equation (2), $T_i$ is a transfer function to indicate a total gain of an amplification circuit and a filter or the like that are provided inside or outside of the transmitter $9i$. Normally, this transfer function $T_i$ is a complex number including the both of the amplitude component and the phase component.

In order to harmonize the antenna patterns at the transmission/reception, the following equation should be established in the antenna apparatus.

[Equation 3]

$$Y_{ti} = Y_{ri} \quad (3)$$

If the equations (1) and (2) are assigned into the equation (3), the following equation can be obtained.

[Equation 4]

$$Y_{ti} = (W_{0i}/M_i R_i) M_i T_i S_{ri} = W_{0i}(T_i/R_i) S_{ri} \quad (4)$$

Here, the following equation is presumed.

[Equation 5]

$$D_i = T_i/R_i \quad (5)$$

As a coefficient for correcting $D_i$, a coefficient $C_i$ is obtained as represented by the following equation, because $D_i$ is different in each antenna element.

[Equation 6]

$$C_i = R_i/T_i \quad (6)$$

If based on a signal to be transmitted from the antenna element 11, a calibration factor $H_i$ for correcting a signal to be transmitted from the antenna element $1i$ is obtained by the following equation.

[Equation 7]

$$H_i = C_i/C_1 = (T_1 R_i / T_i R_1) \quad (7)$$

In the next place, the operation for measuring the calibration factor is described below.

As shown in FIG. 6, in the RF switch 51, the terminal c1 is connected to the terminal 3 of the directional coupler 42, and the terminal c2 is connected to the terminal b3 of the RF switch 71.

In the RF switch 62, the terminal d1 is connected to the terminal b3 of the RF switch 72, and the terminal d2 is connected to the terminal 3 of the directional coupler 41.

In the beginning, when calibrating the signal to be transmitted from the antenna element 12, the terminals a1 and a2 are connected in the RF switches 31 and 32, respectively. The terminals d1 and d2 of the RF switch 62 are connected, and the terminals b1 and b3 of the RF switch 72 are connected to each other. Further, the terminals c1 and c2 of the RF switch 51 are connected, and the terminals b1 and b3 of the RF switch 71 are connected to each other.

Under such a condition, a signal $T_1$ from the transmitter 81 is inputted to the terminal 1 of the directional coupler 41. The signal is coupled from the terminal 1 to the terminal 3 in the directional coupler 41 to be inputted to the terminal d2 of the RF switch 62, and then, this signal is inputted to the receiver 92 via RF switch 72. At this point, the receiver 92 measures the amplitude and the phase of the signal as a received signal $T_1 R_2$.

In the same way, a signal $T_2$ from the transmitter 82 is inputted to the terminal 1 of the directional coupler 42. The signal is coupled from the terminal 1 to the terminal 3 in the directional coupler 42 to be inputted to the terminal c1 of the RF switch 51, and then, this signal is inputted to the receiver 91 via RF switch 71. In this case, the receiver 91 measures the amplitude and the phase of the signal as a received signal $T_2 R_1$.

In the same way, in order to obtain the calibration factor for correcting a signal to be transmitted from the antenna element $1i$, as shown in FIG. 7, in the antenna switches $3i-1$ and $3i$, the terminals a1 and a2 are connected to each other, respectively. Then, the transmitters $8i-1$ and $8i$ transmit signals $T_{i-1}$ and $T_i$, respectively.

When the transmitter $8i-1$ transmits the signal $T_{i-1}$, the signal coupled from the terminal 1 to the terminal 3 in the directional coupler $4i-1$ is sent to the receiver $9i$ via an RF switch that is not shown in FIG. 7. Then, the receiver $9i$ measures the amplitude and the phase of the signal as a received signal $T_{i-1} R_i$.

In the same way, when the transmitter $8i$ transmits the signal $T_i$, the signal coupled from the terminal 1 to the terminal 3 in the directional coupler $4i$ is sent to the receiver $9i-1$ via an RF switch that is not shown in FIG. 7. Then, the receiver $9i-1$ measures the amplitude and the phase of the signal as a received signal $T_i R_{i-1}$.

Thus, the calibration factor for correcting a signal to be transmitted from the antenna element $1i$ can be obtained from the following equation.

[Equation 8]

$$\begin{aligned} H_i &= C_i/C_1 \\ &= (T_1 R_i / T_i R_1) \\ &= T_1 R_2 \cdot T_2 R_3 - T_{i-1} R_i / T_2 R_1 \cdot T_3 R_2 - T_i R_{i-1} \end{aligned} \quad (8)$$

SUMMARY OF THE INVENTION

However, in the conventional signal calibration circuit and the antenna apparatus using it, an error may be generated in the calibration factor that is obtained by the above described calibration method. For example, according to the calculation of a calibration factor $H_i$ on the basis of the equation (8), the amplitude change and the phase difference between the RF switches composing a signal correction circuit shown in FIG. 6 are not considered, so that the amplitude change and the phase difference there between may be included in the calibration factor as an error. In order to accurately correct the error, a layout of the wiring between the RF switches may be restricted.

In addition, according to the above described method for obtaining the calibration factor, since a received signal $R_i$ of each antenna element $1i$ is not directly measured, $W_{0i}$ of each receiver is not possible to be directly obtained. Accordingly, this involves a disadvantage such that, the arrival direction of the signal received by antenna elements may not be estimated on the basis of the obtained calibration factor.

The present invention is conceived taking the foregoing problems into consideration and provides an antenna apparatus capable of measuring a calibration factor accurately and capable of estimating an arrival direction of a received signal by configuring a calibration circuit using a directional coupler.

In order to solve or alleviate the above mentioned problems, an antenna apparatus according to an embodiment of the present invention may include: a first branch unit including a first antenna element, a first transmitter, and a first directional coupler for outputting a received signal from the first antenna element to an output terminal during the reception, outputting a transmitting signal from the first transmitter to the first antenna element during the transmission, and providing feedback of the transmitting signal from the first transmitter to the output terminal with a predetermined attenuation rate; a second branch unit including a second antenna element, a second transmitter, and a second directional coupler for outputting a received signal from the second antenna element to an output terminal during the reception, outputting a transmitting signal from the second transmitter to the second antenna element during the transmission, and providing feedback of a transmitting signal from the second transmitter to the output terminal with a predetermined attenuation rate; a third directional coupler for outputting an inputted signal of a first input terminal to a first output terminal during the reception, coupling the inputted signal to a second output terminal with a predetermined attenuation rate, outputting an inputted signal of a second input terminal to a second output terminal, and coupling the inputted signal to a first output terminal with a predetermined attenuation rate, wherein the first and the second input terminals are connected to directional couplers at the first branch unit and the second branch unit, respectively, and the first and the second output terminals are connected to the first and the second receivers, respectively; and operating means for obtaining a calibration factor for calibrating the second branch unit in accordance with a first received signal for calibrating, which is coupled to the second receiver by the first and third directional couplers when the first transmitter transmits the signal, and a second received signal for calibrating, which is coupled to the first receiver by the second and third directional couplers when the second transmitter transmits the signal.

According to another embodiment of the present invention, it is preferable that the operating means obtains a calibration factor to be applied to the second branch unit in accordance with a ratio between the first received signal and the second received signal using the first branch unit as a reference.

According to still another embodiment of the present invention, it is preferable that in the third directional coupler, an attenuation rate in the case that the inputted signal of the first input terminal is sent to the second output terminal and an attenuation rate in the case that the inputted signal of the second input terminal is sent to the first output terminal are equally formed.

The antenna apparatus according to another embodiment of the present invention may include: L-number branch units (L≧2, L is an integer) having antenna elements, directional couplers and transmitters, wherein the directional couplers output the received signal from the antenna element to an output terminal during the reception, output the transmitting signal from the transmitter to the antenna element during the transmission, and provides feedback of the transmitting signal from the transmitter to the output terminal with a predetermined attenuation rate; a plurality of directional couplers at a second layer, each of which is provided for each pair of the L-number branch units, wherein a first input terminal is connected to the directional coupler at the ith branch unit (1≦i≦L, i is an odd number), a second input terminal is connected to the directional coupler at the (i+1)th branch unit, an inputted signal from the first input terminal is sent to a first output terminal, an inputted signal from the second input terminal is coupled to a first output terminal with a predetermined attenuation rate, and further, an inputted signal from the second input terminal is sent to second output terminal, and an inputted signal from the first input terminal is coupled to the second output terminal with a predetermined attenuation rate; a plurality of directional couplers at a third layer, which are provided to the directional couplers at the second layer on a one-to one basis, wherein first and second input terminals are connected to a first output terminal or a second output terminal of the adjoining directional coupler at the second layer, and the receiver is connected to the first and second output terminals; and operating means for obtaining a calibration factor at the each branch unit in accordance with the received signals of the (i−1)th and (i+1) th receivers when the transmitter at the ith branch unit transmits a signal.

According to the embodiment of the present invention, it is preferable that the directional coupler at the third layer outputs the inputted signal of the first input terminal to the first output terminal, and couples the inputted signal to the second output terminal with a predetermined attenuation rate, outputs the inputted signal of the second input terminal to the second output terminal, and at the same time, couples the inputted signal to the first output terminal with the predetermined attenuation rate.

According to the embodiment of the present invention, it is preferable that, assuming that, when the transmitter at the ith branch unit transmits a signal, the received signal at the (i−1)th receiver is defined as $T_iR_{i-1}$, and when the transmitter at the (i−1)th branch unit transmits a signal, the received signal at the ith receiver is defined as $T_{i-1}R_i$, the operating means calculates a calibration factor $H_i$ at the ith branch unit on the basis of the first branch unit by the following equation, namely, $$H_i = T_1 R_i / (T_i R_1)$$
$$= T_1 R_2 \cdot T_2 R_3 - T_{i-1} R_i / T_2 R_1 \cdot T_3 R_2 - (T_i R_{i-1}).$$

As described above, it is possible to easily obtain a calibration factor for calibrating variations of a transfer function of a transmitter and a receiver and a signal propagation characteristic of each branch unit by providing the directional couplers, which are formed symmetrically in a structure, at respective branch units.

Further, there is an advantage such that it is possible to calculate the optimum coefficient at each branch unit, respectively, and by thus, an arrival direction of a received signal can be estimated.

BRIEF DESCRIPTION OF THE DRAWINGS

The invention disclosed herein will become better understood as a detailed description is made of the preferred embodiments with reference to the appended drawings in which.

DESCRIPTION OF THE PREFERRED EMBODIMENT(S)

<A First Embodiment>

Figure 1:
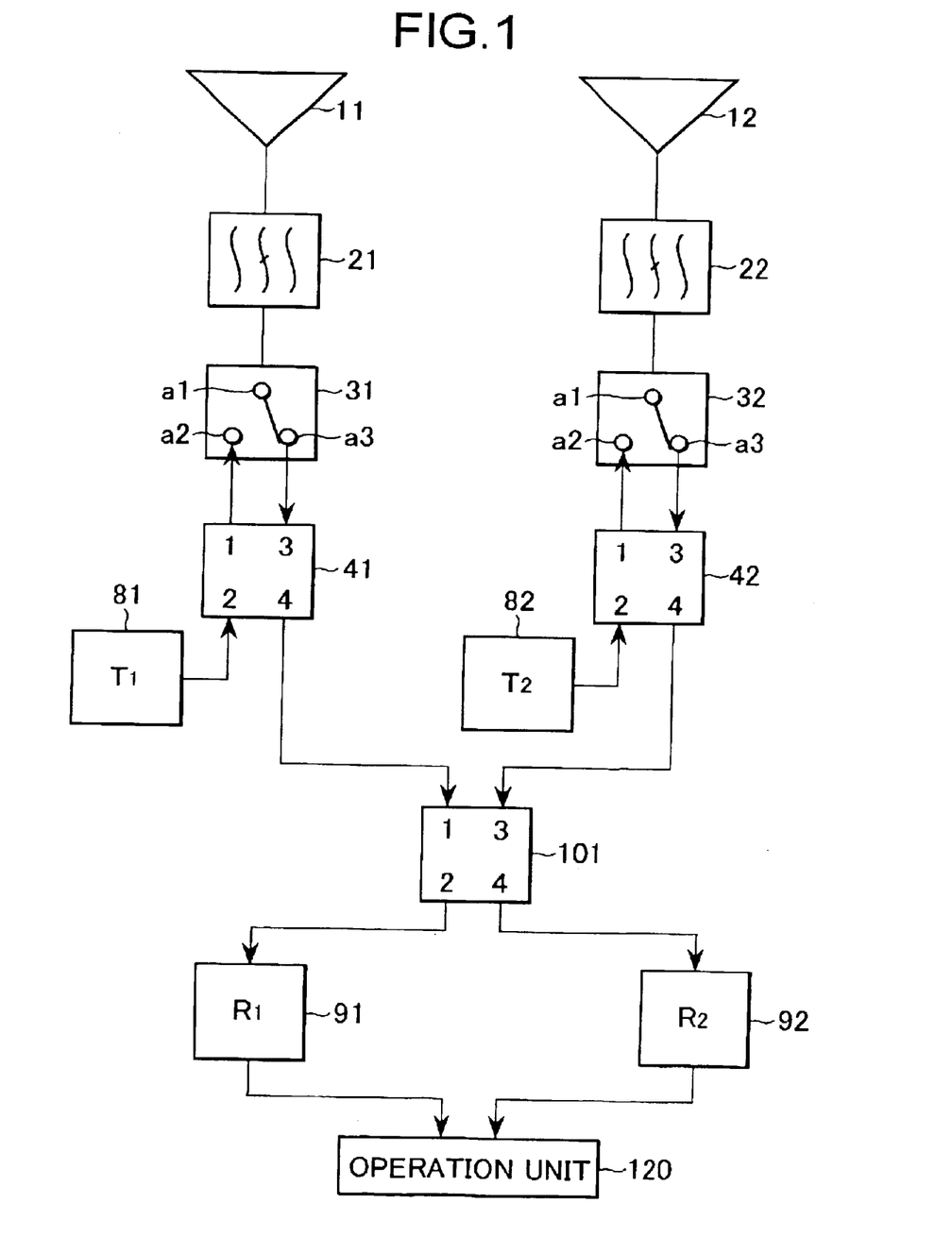
FIG. 1 is a circuit diagram for illustrating a first embodiment of an antenna apparatus according to the present invention.

FIG. 1 is a circuit diagram for illustrating a first embodiment of an antenna apparatus according to the present invention.

FIG. 1 depicts a configuration example of the antenna apparatus having two antenna elements 11 and 12, two transmitters 81 and 82 and two receivers 91 and 92. In other words, the antenna apparatus according to the present embodiment shows a basic configuration example of the antenna apparatus that employs a correction circuit. In the present embodiment, a calibration circuit is configured of a directional coupler 101.

As shown in FIG. 1, a filter 21 is connected between the antenna element 11 and an antenna switch 31, one terminal of the filter 21 is connected to the antenna element 11 and the other terminal thereof is connected to a terminal a1 of the antenna switch 31. In the antenna switch 31, a terminal a2 is connected to a terminal 1 of a directional coupler 41 and a terminal a3 is connected to a terminal 3 of the same. A terminal 2 of the directional coupler 41 is connected to a transmitter 81 and a terminal 4 thereof is further connected to a terminal 1 of a directional coupler 101.

In the same way, a filter 22 is connected between the antenna element 12 and an antenna switch 32. One terminal of a filter 22 is connected to the antenna element 12 and the other terminal is connected to a terminal a1 of the antenna switch 32. In the antenna switch 32, a terminal a2 is connected to a terminal 1 of a directional coupler 42 and a terminal a3 is connected to a terminal 3 of the same. A terminal 2 of the directional coupler 42 is connected to a transmitter 82 and a terminal 4 thereof is further connected to a terminal 3 of the directional coupler 101. In the directional coupler 101, a terminal 2 is connected to a receiver 91 and a terminal 4 is connected to the receiver 92.

In addition, as shown in FIG. 1, the transmitters 81 and 82 have transfer functions $T_1$ and $T_2$, respectively and the receivers 91 and 92 have transfer functions $R_1$ and $R_2$, respectively. An operation unit 120 obtains the calibration factors in accordance with the received signals of the receivers 91 and 92.

Figure 2:
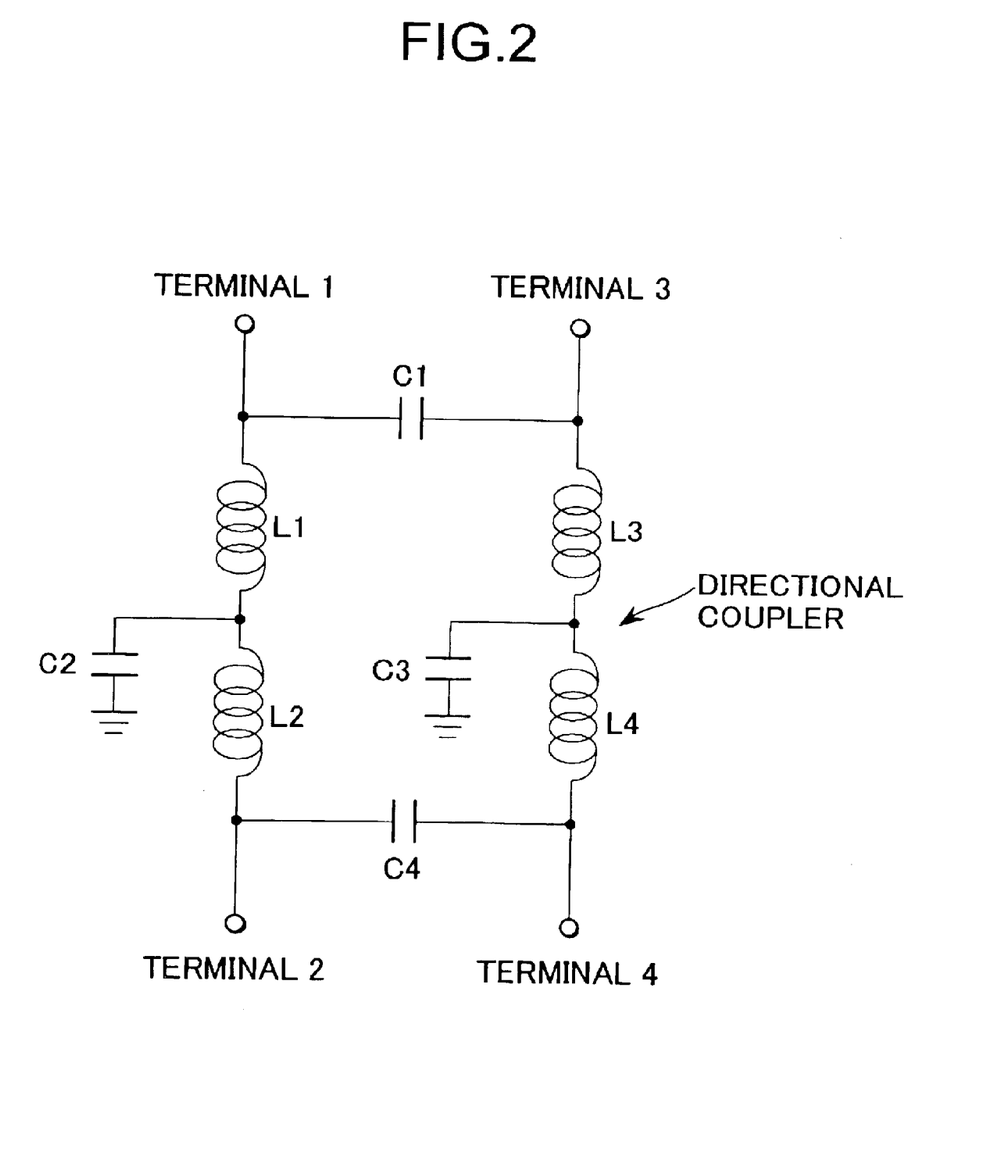
FIG. 2 is a circuit diagram for illustrating a configuration example of a directional coupler.

FIG. 2 is a circuit diagram for illustrating a configuration example of a directional coupler. As shown in the drawings, this directional coupler has four terminals 1, 2, 3 and 4, and between the terminals 1 and 2, inductance elements, for example, coils L1 and L2 are connected in series. In addition, between a connecting point of the coils L1 and L2 and ground electric potential GND, a capacitor C2 is connected.

In the same way, between the terminals 3 and 4, the inductance elements, for example, coils L3 and L4 are connected in series. In addition, between a connecting point of the coils L3 and L4 and ground electric potential GND, a capacitor C3 is connected. Between the terminals 1 and 3, a capacitor C1 is connected, and between the terminals 2 and 4, a capacitor C4 is connected.

In the directional coupler configured as shown in FIG. 2, a signal is propagated between the terminals with a predetermined amplitude attenuation rate and a predetermined phase difference. For example, a signal to be inputted to the terminal 1 is sent to the terminal 2 as well as sent to the terminals 3 and 4. However, in relation to the inputted signal of the terminal 1, an amplitude and a phase difference of a signal to be sent to the terminal 2 and an amplitude and a phase difference of a signal to be sent to the terminals 3 and 4 may serve as a specific parameter of the directional coupler. For example, the inputted signal from the terminal 1 is sent to the terminal 2 with an amplitude attenuation rate $A_{t12}$ and a phase change $\theta_{12}$. In addition, the inputted signal from the terminal 1 is sent to the terminal 3 with an amplitude attenuation rate $A_{t13}$, and further, it is sent to the terminal 4 with an amplitude attenuation rate $A_{t14}$. However, there is no phase difference between the inputted signal from the terminal 1 and the outputted signal to the terminals 3 and 4.

In the same way, the inputted signal from the terminal 2 is sent to the terminal 1 with an amplitude attenuation rate $A_{t21}$ and a phase change $\theta_{21}$. In addition, the inputted signal from the terminal 2 is sent to the terminal 3 with an amplitude attenuation rate $A_{t23}$, and further, it is sent to the terminal 4 with an amplitude attenuation rate $A_{t24}$. However, there is no phase difference between the inputted signal from the terminal 2 and the outputted signal to the terminals 3 and 4.

The inputted signal from the terminal 3 is sent to the terminal 4 with an amplitude attenuation rate $A_{t34}$ and a phase change $\theta_{t34}$, and is sent to the terminal 1 with an amplitude attenuation rate $A_{t31}$, and then, it is sent to the terminal 4 with an amplitude attenuation rate $A_{t34}$. However, there is no phase difference between the inputted signal from the terminal 3 and the outputted signal to the terminals 1 and 4.

Further, the inputted signal from the terminal 4 is sent to the terminal 3 with an amplitude attenuation rate $A_{t43}$ and a phase change $\theta_{43}$, and is sent to the terminal 1 with an amplitude attenuation rate $A_{t41}$, and then, it is sent to the terminal 2 with an amplitude attenuation rate $A_{t42}$. However, there is no phase difference between the inputted signal from the terminal 4 and the outputted signal to the terminals 1 and 2.

By appropriately setting the values of the coils L1 to L4 and the capacitors C1 to C4 composing the directional coupler, a parameter of the above described each amplitude attenuation rate and the phase difference can be controlled to a desired value. Thus, in the directional coupler, the amplitude and the phase of a signal to be sent to other each terminal can be controlled on the basis of a signal to be inputted to one terminal.

Here, in the directional coupler, the values of each coil and each capacitor is appropriately set so that a relation of $\theta_{12}=\theta_{21}=\theta_{34}=\theta_{43}$, $A_{t12}=A_{t21}=A_{t34}=A_{t43}>>A_{t13}=A_{t31}=A_{t24}=A_{t42}>>A_{t14}A_{t41}=A_{t23}=A_{t32}$ can be established.

In other words, in the antenna apparatus shown in FIG. 1, when, for example, a transmitting signal $T_1$ of the transmitter 81 is inputted to the terminal 2 by employing the directional coupler 41, in accordance with the transmitting signal $T_1$, the amplitudes and the phases of a signal to be sent to the terminal 1 and a signal to be sent to the terminal 4 is controlled by parameters of each coil and each capacitor of the directional coupler 41. In the same way, when a transmitting signal $T_2$ is inputted to the terminal 2 of the directional coupler 42 by the transmitter 82, in accordance with the transmitting signal $T_2$, the amplitudes and the phases of the signals to be sent to the terminal 1 and the terminal 4 are controlled by parameters of each coil and each capacitor composing this directional coupler 42.

In addition, in the directional coupler 101, when, for example, the received signal from the terminal 4 of the directional coupler 41 is inputted to the terminal 1, the amplitudes and the phases of the signals to be sent from the terminals 2 and 4 is controlled by parameters of each coil and each capacitor of this directional coupler 101. Further, when the received signal from the terminal 4 of the directional coupler 42 is inputted to the terminal 3, the amplitude and the phase of the signals to be sent from the terminals 2 and 4 is controlled by parameters of each coil and each capacitor of this directional coupler 101.

The operation of the antenna apparatus that is structured as described above will be described below.

At first, the normal transmission operation will be described. During the normal transmission, in the antenna switches 31 and 32, their own terminals a1 and a2 are connected to each other. Thus, the outputted signal of the transmitter 81 is inputted to the terminal 2 of the directional coupler 41, and in accordance with this, the outputted signal from the terminal 1 is inputted to the filter 21 through the antenna switch 31. A predetermined signal component is taken out by the filter 21, and it is transmitted to the antenna element 11 as the transmitting signal.

In the same way, the outputted signal of the transmitter 82 is inputted to the terminal 2 of the directional coupler 42, and in accordance with this, the outputted signal from the terminal 1 is inputted to the filter 22 through the antenna switch 32. A predetermined signal component is taken out by the filter 22, and it is transmitted to the antenna element 12 as the transmitting signal.

When the amplitude and the phase of the signals $T_1$ and $T_2$ to be transmitted from the transmitters 81 and 82 are controlled during the normal transmission, it is possible to form a predetermined beam pattern by the transmitting signals from the antenna elements 11 and 12. In other words, by controlling the transmitting signal transmitted from each antenna element, the beam forming can be realized during the transmission.

Next, the normal reception operation will be described below. During the normal reception, in the antenna switches 31 and 32, their own terminals a1 and a3 are connected to each other. Thus, a predetermined signal component is taken out from the received signal of the antenna element 11 by the filter 21, and the predetermined signal component is inputted to the terminal 3 of the directional coupler 41 through the switch 31 as the inputted signal. In the directional coupler 41, a signal based on the inputted signal of the terminal 3 is sent to the terminal 4 and inputted to the terminal 1 of the directional coupler 101.

In the same way, a predetermined signal component is taken out from the received signal of the antenna element 12 by the filter 22, and the predetermined signal component is inputted to the terminal 3 of the directional coupler 42 through the switch 32 as the inputted signal. In the directional coupler 42, a signal based on the inputted signal of the terminal 3 is sent to the terminal 4, and inputted to the terminal 3 of the directional coupler 101.

In the directional coupler 101, the inputted signal from the terminal 1 is sent to the terminal 2, and the inputted signal from the terminal 3 is sent to the terminal 4. Thus, the signal in accordance with the received signal of the antenna element 11 is inputted to the receiver 91, and the signal in accordance with the received signal of the antenna element 12 is inputted to the receiver 92.

Further more, during the reception, a portion of the received signal of the antenna element 12 of the second branch unit is mixed in the receiver 91 of the first branch unit. In the same way, in the receiver 92 of the second branch unit, a portion of the received signal of the antenna element 11 of the first branch unit is mixed. For example, the received signal of the antenna element 11 is inputted to the terminal 1 of the directional coupler 101 through the filter 21, the antenna element 31 and the directional coupler 41. In the directional coupler 101, the inputted signal of the terminal 1 is sent to the terminal 2 with the amplitude attenuation rate $A_{r12}$, and at the same time, it is also sent to the terminal 4 with the amplitude attenuation rate $A_{r14}$.

On the other hand, the received signal of the antenna element 12 of the second branch unit is inputted to the terminal 3 of the directional coupler 101 through the filter 22, the antenna switch 32 and the directional coupler 42. In the directional coupler 101, the inputted signal of the terminal 3 is sent to the terminal 4 with the amplitude attenuation rate $A_{r34}$.

Thus, to the receiver 92 of the second branch unit, the received signal of the antenna element 11 (which was attenuated with the amplitude attenuation rate $A_{r14}$ of the directional coupler 101) is mixed in the received signal of the antenna element 12.

In the same way, to the receiver 91 of the first branch unit, the received signal of the antenna element 12 (which was attenuated with the amplitude attenuation rate $A_{r32}$ of the directional coupler 101) is mixed in the received signal of the antenna element 11.

From a practical standpoint, by controlling the amplitude attenuation rates $A_{r14}$ and $A_{r32}$ of the directional coupler 101 at lower level, it is possible to suppress the influence of the signals received by the antenna element of the adjoining branch units to a negligible level.

Next, the operation of the calibration in the antenna system according to the present embodiment will be described below.

In the antenna apparatus according to the present embodiment shown in FIG. 1, each branch unit includes a filter, an antenna switch, a directional coupler connected to an antenna element, a transmitter and a receiver, which correspond to this antenna element. For example, in FIG. 1, the branch unit (hereinafter, referred to as a first branch unit) includes the antenna element 11, the filter 21, the antenna switch 31, the directional coupler 41, and the transmitter 81 and the receiver 91. In the same way, another branch unit (hereinafter, referred to as a second branch unit) includes of the antenna element 12, the filter 22, the antenna switch 32, the directional coupler 42, the transmitter 82 and the receiver 92, which correspond to these.

According to the calibration in the antenna apparatus according to the present embodiment, one branch unit is defined as a reference, and the other branch unit obtains an error of the amplitude and the phase of the signal during the transmission and the reception in relation to the above described reference branch unit. Then, the calibration factor of each branch unit, except for this reference branch unit, is obtained so as to cancel this error. During the transmission and the reception, by correcting the transmitted and received signals of each branch unit, except for the reference branch unit, with the above obtained calibration factor, the error between the branch units can be corrected.

In the calibration process, the transmission is carried out in one branch unit, and this transmitting signal is transmitted and received by the antenna element of this branch unit, and at the same time, a portion of this transmitting signal is returned to the receiver of the other branch unit by the directional coupler. In the receiver of the other branch unit, the returned signal is measured. Then, on the basis of the measured signal of the receiver of each branch unit, the calibration factor is estimated.

For example, when the transmission is carried out by the transmitter 81 on the basis of the first branch unit in this case, the transmitting signal $T_1$ to be sent from the transmitter 81 is inputted to the terminal 2 of the directional coupler 41. The directional coupler 41 transfers a portion of the inputted signal from the terminal 2 to the terminal 1, and further, it is transmitted to the antenna element 11 through the antenna switch 31 and the filter 21. In addition, in the directional coupler 41, a portion of the inputted signal from the terminal 2 is returned to the terminal 4. This feedback signal is inputted to the terminal 1 of the directional coupler 101, and in the directional coupler 101, a portion of the inputted signal of the terminal 1 is returned to the terminal 4 to be inputted to the receiver 92.

The receiver 92 receives the outputted signal $R_2$ from the terminal 4 of the directional coupler 101. Then, in accordance with this outputted signal $R_2$ and the outputted signal $T_1$ of the transmitter 81, the calibration factor is obtained. A method to calculate the calibration factor will be described below.

In the following explanation, in order to represent the amplitude and the phase of the signal simply, a code representing a transmitting signal and a received signal is defined as a complex number. In addition, all parameters such as the calibration factor are defined as a complex number.

Here, a method to obtain the calibration factor in the second branch unit on the basis of the first branch unit will be described below.

In the antenna apparatus, a signal is received by the antenna element and is transmitted to the receiver via the filter, the antenna switch and the directional coupler. Thus, in each branch unit, assuming that a transfer function of the antenna element, the filter and the signal propagation path, for example, a transmission line including a cable is defined as $M_i$ (in the present embodiment, i=1, 2), a transfer function of the receiver is defined as $R_i$, and further, a calibration factor is defined as $W_{0i}$, the calibration factor $W_{0i}$ is obtained by the following equation.
[Equation 9]

$$W_{0i} = W_i M_i R_i \tag{9}$$

In the equation (9), $W_i$ is a weighting factor to be appropriately applied to the received signal for the beam pattern in the case that the calibration is not performed.

On the other hand, when the transmission is carried out by using the same beam pattern, assuming that the transmitting signal in the base band is defined as $S_i$, a signal $Y_{ti}$ that is emitted by the antenna element is represented by the following
[Equation 10]

$$Y_{ti} = W_i M_i T_i S_i \tag{10}$$

In the equation (10), $T_i$ is a transfer function of the transmitter. A transfer function $M_i$ of the antenna element, the filter and the signal propagation path during the transmission is the same as that during the reception.

From the equation (9), $W_i = W_{0i}/(M_i R_i)$ is established. Therefore, if this is assigned in the equation (10), the following equation is obtained.
[Equation 11]

$$Y_{ti} = W_{0i}(T_i/R_i)S_i \tag{11}$$

According to the equation (11), a calibration factor $K_i$ at the ith branch unit is given by the following equation.
[Equation 12]

$$K_i = R_i/T_i \tag{12}$$

In addition, the directionality of the antenna array is decided by the relative amplitude difference and the relative phase difference between relative branch units. Thus, the calibration for the array antenna is carried out by obtaining the relative amplitude difference and the relative phase difference between one certain branch unit (reference branch unit) and the other branch unit. In this case, if the first branch unit is defined as the reference branch, the calibration factor $K_{21}$ at the second branch unit in relation to this reference branch unit is obtained by the following equation.
[Equation 13]

$$\begin{aligned} K_{21} &= K_2/K_1 \\ &= (R_2/T_2)(R_1/T_1) \\ &= T_1 R_2/T_2 R_1 \end{aligned} \tag{13}$$

In other words, the calibration factor $K_{21}$ at the second branch unit in relation to the reference branch unit can be obtained base on the transfer functions of the transmitter and the receiver at the first branch unit and the second branch unit, respectively.

In the next place, with reference to FIG. 1, the measurement operation of the calibration factor $K_{21}$ in the antenna apparatus according to the present embodiment will be described below.

According to the equation (13), the calibration factor $K_{21}$ is can be calculated by a division process of a product of the transfer function $T_1$ of the transmitter 81 and the transfer function $R_2$ of the receiver 92 and a product of the transfer function $T_2$ of the transmitter 82 and the transfer function $R_1$ of the receiver 91.

Thus, when transmitter 81 carries out the transmission, a feedback signal $S_{C2}$ is received by the receiver 92 by returning a portion of the transmitting signal to the receiver 92, and when the transmitter 81 transmits the same signal, a feedback signal $S_{C1}$ is received by the receiver 91 by returning a portion of the transmitting signal to the receiver 91. Accordingly, the received signal $S_{C2}$ includes the transfer characteristics of both of the transmitter 81 and the receiver 92, and the received signal $S_{C1}$ includes the transfer characteristics of both of the transmitter 82 and the receiver 91. Thus, the calibration factor $K_{21}$ can be obtained from the following equation on the basis of the received signal $S_{C1}$ and the received signal $S_{C2}$.
[Equation 14]

$$K_{21} = S_{C2}/S_{C1} \tag{14}$$

In the next place, the measurement of the signals $S_{C1}$ and $S_{C2}$ will be described further in detail.

When the transmitter 81 transmits the signal $S_{t1}$, the outputted signal of the transmitter 81 is inputted to the terminal 2 of the directional coupler 41. In the directional coupler 41, the inputted signal from the terminal 2 is sent to the terminal 1, and at the same time, a portion of the inputted signal is returned to the terminal 4. This feedback signal is inputted to the terminal 1 of the directional coupler 101 to be sent to the terminal 4 by the directional coupler, 101 and further, to be inputted to the receiver 92. Thus, the outputted signal $S_{C2}$ of the receiver 92 includes the transfer characteristic of the transmitter 81, of the receiver 92, and of the directional couplers 41 and 101. Since the transfer characteristics of the directional couplers 41 and 101 are known, the transfer characteristics of the transmitter 81 and of the receiver 92 can be estimated on the basis of the received signal $S_{C2}$.

Then, when the transmitter 82 outputs the transmitting signal $S_{t2}$ ($S_{t2}=S_{t1}$), an outputted signal from the transmitter 82 is inputted to the terminal 2 of the directional coupler 42. In the directional coupler 42, the inputted signal from the terminal 2 is sent to the terminal 1, and at the same time, a portion of the inputted signal is returned to the terminal 4. This feedback signal is inputted to the terminal 3 of the directional coupler 101 and sent to the terminal 2, and inputted to the receiver 91. Thus, the outputted signal $S_{C1}$ of the receiver 91 includes the transfer characteristic of the transmitter 82, of the receiver 91 and of the directional couplers 42 and 101. Since the transfer characteristics of the directional couplers 41 and 101 are known, the transfer characteristics of the transmitter 82 and of the receiver 91 can be estimated on the basis of the received signal $S_{C1}$.

As described above, the calibration factor $K_{21}$ is obtained from the equation (14) on the basis of the received signals $S_{C1}$ and $S_{C2}$. In addition, according to the equation (14), it is possible to obtain the calibration factor $K_{21}$ even if the transfer characteristics of the directional couplers 41 and 42, and of the directional coupler 101 are not known. For example, if the directional couplers 41 and 42 are formed so as to have the same properties and the directional coupler 101 is formed symmetrically, when obtaining the calibration factor $K_{21}$ from the equation (14), the transfer functions of the directional couplers are cancelled each other, so that the transfer characteristics of the transmitter and the receiver may only remain.

The calibration factor obtained in this way is used for calibrating the signal during the transmission. In other words, when the transmitter 82 transmits the signal $S_2$, a signal $K_{21}S_2$ obtained by multiplying the transmitting signal $S_2$ by the calibration factor $K_{21}$ is transmitted. Thus, the signal, of which amplitude error and phase error are calibrated, is transmitted from the second branch unit to the first branch unit used as the reference branch unit.

As described above, according to the present embodiment, the directional couplers 41 and 42 are provided at respective branch units to return the outputted signals of the transmitter, and further, the directional coupler 101 is provided to output the feedback signals from the directional couplers at each branch unit to the receiver of the other branch unit. This enables to obtain the calibration factor at the other branch unit on the basis of one certain reference branch unit. Thus, it is possible to simplify the calibration circuit and to easily calibrate the amplitude error and the phase error between respective branch units. In addition, by symmetrically controlling the transfer characteristics of the directional couplers of respective branch units and of the directional couplers between branch units, it is possible to ignore the influence due to the transfer characteristics of the directional couplers in the case of obtaining the calibration factor.

<A Second Embodiment>

Figure 3:
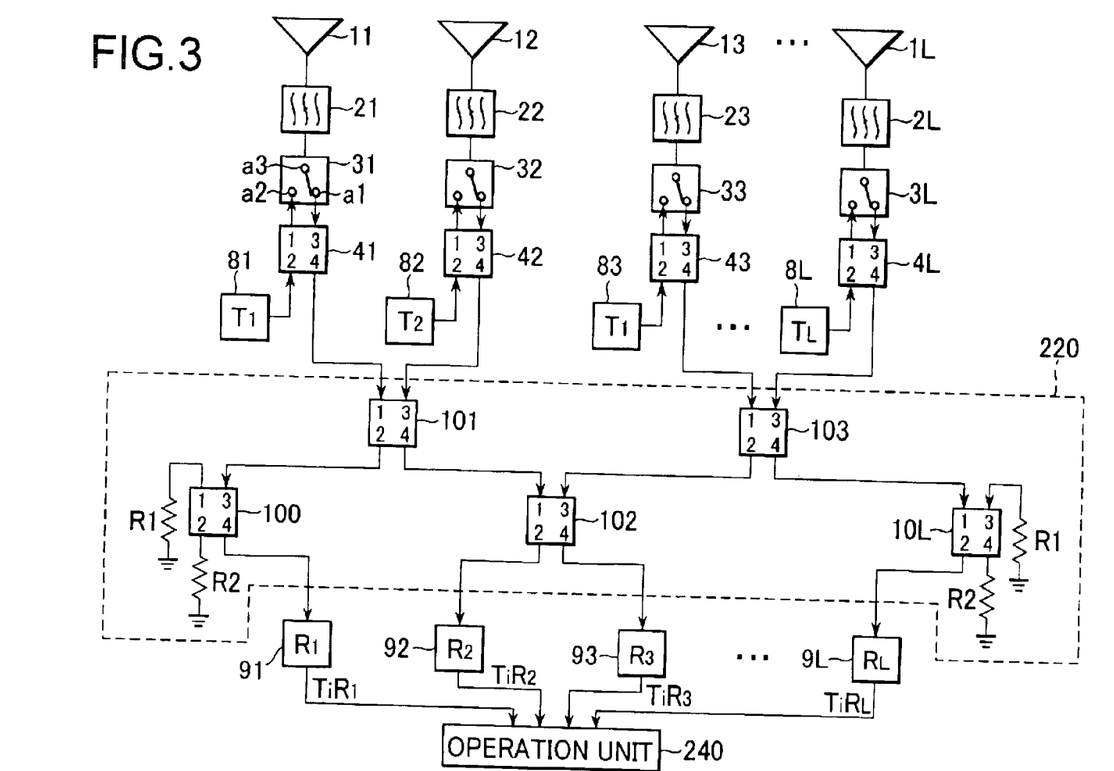
FIG. 3 is a circuit diagram for illustrating a second embodiment of the antenna apparatus according to the present invention.

FIG. 3 is a circuit diagram for illustrating a second embodiment of the antenna apparatus according to the present invention.

As shown in the drawing, the antenna apparatus according to the present embodiment is structured by L-number of branch units. At each branch unit, an antenna element, a filter, an antenna switch, a directional coupler, a transmitter and a receiver are provided, respectively.

For example, at a first branch unit, an antenna element 11 is connected to a terminal a1 of an antenna switch 31 through a filter 21. In a directional coupler 41, a terminal 1 is connected to a terminal a2 of the antenna switch 31, a terminal 3 is connected to a terminal a1 of the antenna switch 31, a terminal 2 is connected to a transmitter 81 and a terminal 4 is connected to a terminal 1 of a directional coupler 101.

At each branch unit, a calibration circuit 220 for measuring the calibration factor and an operation unit 240 for calculating the calibration factor on the basis of the received signal of the receiver at each branch unit are provided.

In addition, in the directional coupler 101, a terminal 2 is connected to a terminal 3 of a directional coupler 100, and a terminal 3 is connected to a terminal 4 of a directional coupler 42 at a second branch unit. In the directional coupler 100, terminal resistive elements R1 and R2 are connected to a terminal 1 and a terminal 2, respectively, and a receiver 91 is connected to a terminal 4.

As shown in FIG. 3, directional couplers 41, 42, 43-4L are provided at each branch unit, respectively. In the calibration circuit 220, directional couplers 101, 103-10L-1 are provided for each pair of branch units. Further, the other directional couplers 102-10L, except for the directional coupler 100, are provided to the directional couplers 101, 103-10L-1 on a one-to-one basis.

In other words, in the antenna apparatus according to the present embodiment, the directional couplers 41, 42, 43-4L at each branch unit and the directional couplers 101, 103-10L-1 and the directional couplers 100, 102-10L in the calibration circuit 220 are constructed as a hierarchy structure. The directional couplers 41, 42, 43-4L at a first layer are provided for each branch unit, and the directional couplers 101, 103-10L-1 at a second layer are provided for each pair of directional couplers at the first layer. In other words, at the second layer, there are (L/2)-number of the directional couplers. The directional couplers 100, 102-10L at a third layer, except for the directional coupler 100, are provided to the directional coupler at the second layer on a one-to-one basis. In other words, there are (L/2+1)-number of the directional couplers at the third layer.

To the directional couplers 100 and 10L, the terminal resistive elements are connected, respectively. In the directional couplers other than 100 and 10L, the terminals 1 and 3 at one side are connected to the upper directional couplers 101, 103-10L-1, and the terminals 2 and 4 at the other side are connected to the receivers 92, 93-9L. In addition, the terminal 3 of the directional coupler 100 is connected to the directional coupler 101, the terminal 4 thereof is connected to the receiver 91, and in a similar way, the terminal 1 of the directional coupler 10L is connected to a directional coupler 10L-1, which is not illustrated in FIG. 3, and the terminal 2 thereof is connected to a receiver 9L.

In the antenna apparatus that is structured as described above, the terminals a2 and a3 are connected to each other during the transmission in each antenna switch 31 to 3L, and the transmitting signals to be sent from transmitters 81, 82-8L are inputted to the terminals 2 of the directional couplers 41, 42-4L, respectively. These directional couplers allow the transmitting signals to be inputted from the terminals 2 to be transmitted to the terminals 1. Therefore, at each branch unit, the outputted signals from the directional couplers 41-4L are inputted to the filters 21, 22-2L, respectively, through the antenna switches 31-3L, and predetermined frequency components are only taken out by the filters 21-2L to be transmitted to the antenna elements 11, 12-1L, respectively, so that the transmitting signal is emitted in the air by the antenna element 11-1L. Thus, each transmitter transmits the signal, of which amplitude and phase is appropriately controlled, to the antenna element, and a predetermined beam pattern can be formed by transmitting the signal from each antenna element, namely, the transmitting signal is can be transmitted in a predetermined directionality.

During the reception, the terminal a1 is connected to the terminal a3 at each antenna switch 31-3L. In this case, the received signals of respective antenna elements 11, 12-1L are inputted to the filters 21, 22-2L, respectively, predetermined frequency components are only taken out by the filters to be inputted to the terminals 3 of the directional couplers 41, 42-4L via the antenna switches 31, 32-3L, and then, the transmitting signals to be inputted from the terminals 3 are sent to the terminals 4 by these directional couplers.

The outputted signal of the terminal 4 in the directional coupler 41 is inputted to the terminal 1 of the directional coupler 101 to be sent to the terminal 2 thereof. Further, this outputted signal is inputted to the terminal 3 of the directional coupler 100 to be sent to the terminal 4 thereof and to be inputted to the receiver 91.

The outputted signal of the terminal 4 in the directional coupler 42 is inputted to the terminal 3 of the directional coupler 101 to be sent to the terminal 4 thereof. Further, this outputted signal is inputted to the terminal 1 of the directional coupler 102 to be sent to the terminal 2 thereof and to be inputted to the receiver 92.

In this way, the received signals to be sent from the terminal 4 of the directional couplers 41, 42-4L at respective branch units are inputted to the receivers 91, 92-9L at respective branch units by the directional couplers 101, 103-100L-1 in a hierarchy structure and the directional couplers 100, 102-10L.

Therefore, by carrying out appropriately weighing process the amplitude and the phase for the received signal at each receiver, it is possible to form a predetermined received beam pattern. In other words, the signal to arrive at the antenna array can be received by using the predetermined beam pattern corresponding to the weighting factor.

During the reception, to a receiver $9i$ at the ith branch unit, the received signals of the antenna elements $1i-1$ and $1i+1$ of the adjoining branch units are partially mixed in. For example, the received signal from the antenna element 11 is inputted to the terminal 1 of the directional coupler 101 through the filter 21, the antenna element 31 and the directional coupler 41. In the directional coupler 101, the inputted signal of the terminal 1 is sent to the terminal 2 with the attenuation rate $A_{t12}$, and at the same time, this inputted signal is also sent to the terminal 4 with the attenuation rate $A_{t14}$.

On the other hand, the received signal of the antenna element 12 at the second branch unit is inputted to the terminal 3 of the directional coupler 42 through the filter 22 and the antenna switch 32 and is sent to the terminal 4. The outputted signal from the terminal 4 of the directional coupler 42 is inputted to the terminal 3 of the directional coupler 101 and is sent to the terminal 4 with the attenuation rate $A_{t34}$.

To the outputted signal from the terminal 4 of the directional coupler 101, in addition to the outputted signal from the output terminal 4 of the directional coupler 42, a portion of the outputted signal from the terminal 4 of the directional coupler 41 is mixed in. Thus, to the receiver 92 at the second branch unit, the received signal of the antenna element 11 (of which amplitude is attenuated with the amplitude attenuation rate $A_{t14}$ of the directional coupler 101) and the received signal of the antenna element 12 are mixed in.

In the same way, the received signal of the antenna element 13 at the third branch unit is inputted to the terminal 1 of the directional coupler 103 via the filter 23, the antenna switch 33 and the directional coupler 43, and further, the outputted signal from the terminal 2 of the directional coupler 103 is inputted to the terminal 3 of the directional coupler 102. In the directional coupler 102, a large portion of the signal to be inputted to the terminal 3 is sent to the terminal 4 to be transmitted to the receiver 93, however, a portion thereof is attenuated with the amplitude attenuation rate $A_{t32}$ of the directional coupler 102 to be sent to the terminal 2 and to be mixed in the received signal from the antenna element 12.

From a practical standpoint, by controlling the amplitude attenuation rates $A_{t14}$ and $A_{t32}$ of the directional couplers 101, 102-10L-1 at lower level, it is possible to suppress the influence of the received signals of the antenna elements of the adjoining branch units to a negligible level.

In the next place, the calibration operation in the antenna apparatus according to the present embodiment will be described below.

According to the present embodiment, using a certain branch unit as the reference, the calibration factors of the other branch units are obtained, respectively, so as to match the amplitudes and the phases with the amplitudes and the phases of this reference branch unit. Then, by multiplying the transmitting signal and the received signal at each branch unit by the calibration factor at the foregoing branch unit during the transmission or the reception to correct them, it is possible to calibrate variations of the transfer functions at respective branch units.

In this case, for example, on the basis of the first branch unit, the calibration factors of other branch units in relation to this reference branch unit is obtained.

During the reception, a signal arriving in the antenna element 11 at the first branch unit is defined as $X_1$, a signal arriving in the antenna element 12 at the second branch unit is defined as $X_2$ and a signal arriving in the antenna element $1i$ at the ith branch unit (i=1,2-L according to the present embodiment) is defined as $X_i$.

In this case, assuming that the calibration factors at respective branch units are defined as $W_{O1}$, $W_{O2}$-$W_{OL}$, by using these calibration factors, a received signal $Y_{ri}$ by the receiver $9i$ at the ith branch unit can be represented by the following equation.

[Equation 15]

$$Y_{ri} = W_{Oi} X_i \qquad (15)$$

This calibration factor $W_{O1}$ may include the weighting factor $W_i$ to be multiplexed to the received signal for beam forming or the like within the branch unit, a transfer characteristic $M_i$ of the antenna element, the filter and the signal propagation cable and further, a transfer function $R_i$ of the receiver, and these can be represented by the following equation.

[Equation 16]

$$W_{Oi} = W_i M_i R_i \qquad (16)$$

During the transmission, assuming that a transmitting signal at the ith branch unit is defined as $S_i$ and the transfer function of the transmitter $9_i$ is defined as $T_i$. In addition, assuming that the transfer characteristic of the antenna element, the filter and the signal propagation cable is defined as $M_i$, and further, assuming that the transmission and the reception are carried out in the beam pattern having the same directional properties, the weighting factor $W_i$ is used to be multiplexed to the transmitting signal as same as during the reception. Thus, an excitation signal $Y_{ti}$ to be inputted to the antenna element $1_i$ at the ith branch unit during the transmission is given by the following equation.

[Equation 17]

$$Y_{ti} = W_i M_i T_i S_i \qquad (17)$$

By the equation (16), $W_i = W_{Oi}/(M_i R_i)$ is established. If this is assigned to the equation (17), the following equation is obtained.

[Equation 18]

$$Y_{ti} = W_{Oi} S_i (T_i / R_i) \qquad (18)$$

In the equation (18), $T_i/R_i$ is different depending on each branch unit, so that a coefficient $C_i$ for calibration is obtained as the following equation.

[Equation 19]

$$C_i = R_i / T_i \qquad (19)$$

Then, on the basis of the transmitting signal of the antenna element 11 at the first branch unit, in relation to this reference branch unit, a calibration factor $H_{ti1}$ for calibrating the transmitting signal from the antenna element 1*i* at the ith branch unit can be obtained as the following equation.

[Equation 20]

$$H_{i1} = C_i / C_1 \qquad (20)$$
$$= (T_1 R_i)/(T_i R_1)$$

As the equation (20) tells, in the case of being based on the first branch unit, the calibration factor $H_{i1}$ at the ith branch unit can be obtained by the transfer functions of the transmitter and the receiver at the first branch unit and the transfer functions of the transmitter and the receiver at the ith branch unit.

Figure 4:
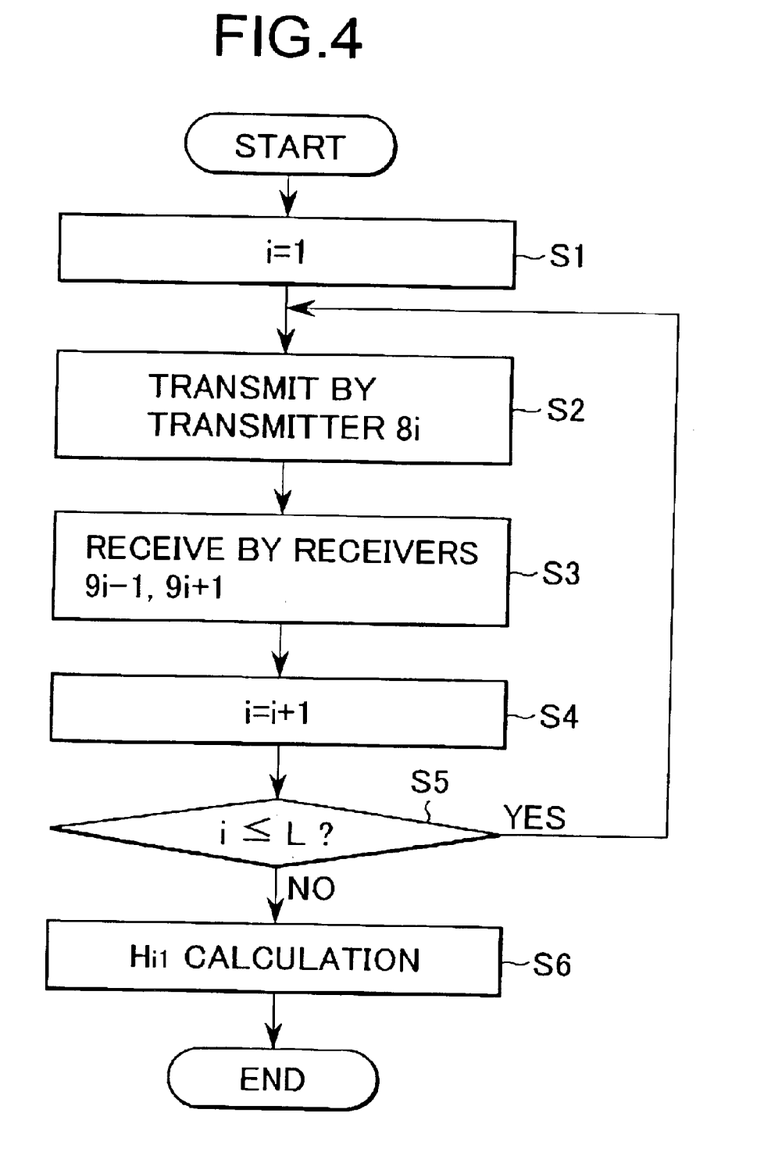
FIG. 4 is a flow chart for showing a process to obtain a calibration factor in the antenna apparatus according to the second embodiment of the present invention.

FIG. 4 is a flow chart for showing a process to obtain a calibration factor in the antenna apparatus according to the present embodiment of the present invention. With reference to FIG. 3, a method to obtain the calibration factor $H_{i1}$ at each branch unit will be described below.

Steps S1, S2:

At first, as assuming that i=1, a signal is sent by the transmitter 8*i*, namely, the transmitter 81 at the first branch unit. Then, the signal of the transmitter 81 is inputted to the terminal 2 of the directional coupler 41 to be sent to the terminal 4 with the amplitude attenuation rate $A_{24}$.

Then, since the outputted signal from the terminal 4 of the directional coupler 41 is inputted to the terminal 1 of the directional coupler 101, and is sent to the terminal 2 in the directional coupler 101, and further, this signal is inputted to the receiver 91 via the directional coupler 100. On the other hand, in the directional coupler 101, the inputted signal of the terminal 1 is attenuated with the attenuation rate $A_{t14}$ to be sent to the terminal 4. Then, this attenuated signal is inputted to the terminal 1 of the directional coupler 102 to be inputted to the receiver 92.

Step S3:

The feedback signals are received by the receivers 9*i*−1 and 9*i*+1, respectively. When transmitting the signal by the transmitter 81, the feedback signal is received only by the receiver 92. In this case, the output from the receiver 92 may include the transfer function $T_1$ of the transmitter 81, the attenuation rate $A_{t24}$ of the directional coupler 41, the attenuation rate $A_{t14}$ of the directional coupler 101, further, the attenuation rate $A_{t12}$ of the directional coupler 102 and the transfer function $R_2$ of the receiver 92. In addition, defining the transfer function combined with the attenuation rates of the directional couplers on the signal propagation path as $R_{12}$, it is possible to represent a received signal $Y_{t2}$ that can be obtained from the receiver 92 in relation to $S_{t1}$ of the transmitter 81 by the following equation.

[Equation 21]

$$Y_{t12} = S_{t1} R_{12} T_1 R_2 \qquad (21)$$

Step 4:

In the next place, assuming that i=i+1, the processes of the above described steps S2 and S3 will be repeated until i arrives at L. In other words, the transmission and the reception is performed sequentially from the first branch unit to the Lth branch unit. If the transmitting signal from the transmitter at each branch unit is made equal to the transmitting signal $S_{t1}$ of the transmitter at the first branch unit, when transmitting the signal by the (i−1)th transmitter, it is possible to represent a received signal $Y_{ti}$ that can be obtained from the ith receiver by the following equation.

[Equation 22]

$$Y_{ti-1, i} = S_{t1} R_{i-1, i} T_{i-1} R_i \qquad (22)$$

In addition, when transmitting the signal by the ith transmitter, it is possible to represent a received signal $Y_{ti, i-1}$ that can be obtained from the i−1th receiver by the following equation.

[Equation 23]

$$Y_{ti, i-1} = S_{t1} R_{i, i-1} T_i R_{i-1} \qquad (23)$$

The above described transmission and reception process is performed with respect to all branch units. Further, assuming that the directional couplers at respective branch units are structured symmetrically here, namely, assuming that the transfer functions combined with the attenuation rates of the directional couplers on the signal propagation path or the like are defined as $R_{12}=R_{21}=R_{23}=R_{32}=R_{i-1, i}=R_{i, i-1}$, on the basis of the first branch unit, it is possible to calculate the calibration factor $H_{i1}$ at each branch unit by the following equation.

[Equation 24]

$$H_{i1} = T_1 R_i / (T_i R_1) \qquad (24)$$
$$= T_1 R_2 \cdot T_2 R_3 - T_{i-1} R_i / T_2 R_1 \cdot T_3 R_2 - (T_i R_{i-1})$$
$$= Y_{t12} Y_{t23} - Y_{ti-1,i} / Y_{t21} Y_{t32} - Y_{ti,i-1}$$

Figure 5:
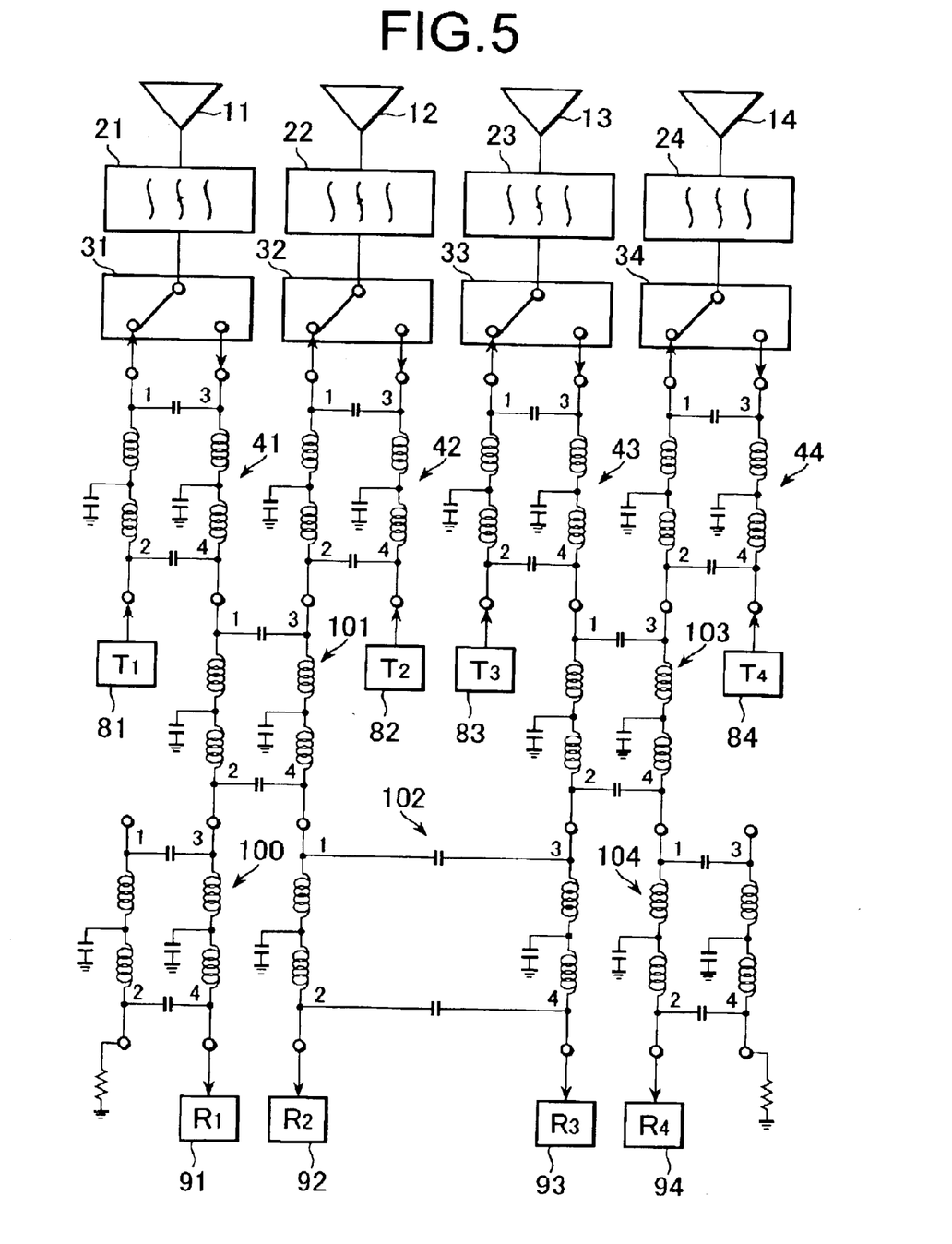
FIG. 5 is a circuit diagram for illustrating a specific example of the antenna apparatus including four branch units.

FIG. 5 shows a configuration example of the antenna apparatus including four branch units. As shown in the drawing, in the antenna apparatus of the present example, each branch unit is structured by an antenna element, a filter, a directional coupler and a transmitter, and a calibration circuit is structured by directional couplers 100, 101, 102, 103 and 104. In FIG. 5, an operation unit for calculating a calibration factor of each branch unit in accordance with the received signals of respective receivers 91, 92, 93 and 94 is herein omitted.

In FIG. 5, with respect to each directional coupler, its detailed structure that is formed by a coil and a capacitor is illustrated. These directional couplers are structured symmetrically. Thus, for example, a propagation path of a signal to be returned to the receiver 92 when the transmitter 81 transmits the signal and a propagation path of a signal to be returned to the receiver 91 when the transmitter 82 transmits the signal have the same transfer characteristics. Therefore, it is possible to easily design the wiring of the calibration circuit, at the same time, to simplify the circuit structure, and to improve the precision of measurement of the calibration factor at each branch unit.

As described above, according to the antenna apparatus of the present embodiment, when obtaining the calibration factor, such a symmetrical structure of the directional couplers at each branch unit enables to make the transfer characteristic of the signal propagation path from the transmitter of the ith branch unit to the (i+1)th receiver and the transfer characteristic of the signal propagation path from the transmitter of the i+1th branch unit to the ith receiver the equal. Thus, in the case of being based on the first branch unit, the calibration factor $H_{i1}$ at each branch unit is can be easily calculated in accordance with the equation (24). In addition, such a symmetrical structure of the directional couplers at each branch unit enables to easily design the wiring compared to a conventional calibration circuit. Further, since it is possible to calculate the each optimum coefficient $W_{0i}$ at each branch unit, an arrival direction of the received signal can be estimated.

Thus, since the invention disclosed herein may be embodied in other specific forms without departing from the scope or general characteristics thereof, some of which forms have been indicated, the embodiments described herein are to be considered in all respects illustrative and not restrictive. The scope of the invention is to be indicated by the appended claims, rather than by the foregoing description, and all changes (including combinations or sub-combinations) which come within the meaning and range of equivalents of the claims are intended to be embraced therein.

What is claimed is:

1. An antenna apparatus, comprising:

a first branch unit including a first antenna element, a first transmitter, and a first directional coupler for outputting a received signal from said first antenna element to an output terminal during the reception, outputting a transmitting signal from said first transmitter to said first antenna element during a transmission, and providing feedback of the transmitting signal from said first transmitter to said output terminal with a predetermined attenuation rate;

a second branch unit including a second antenna element, a second transmitter, and a second directional Coupler for outputting a received signal from said second antenna element to an output terminal during a reception, outputting a transmitting signal from said second transmitter to said second antenna element during the transmission, and providing feedback of a transmitting signal from said second transmitter to said output terminal with a predetermined attenuation rate;

a third directional coupler for outputting an inputted signal of a first input terminal to a first output terminal during the reception, Coupling said inputted signal to a second output terminal with a predetermined attenuation rate, outputting an inputted signal of a second input terminal to a second output terminal, and coupling said inputted signal to a first output terminal with a predetermined attenuation rate, wherein said first and said second input terminals are connected to directional couplers at said first branch unit and said second branch unit, respectively, and said first and said Second output terminals are connected to said first and said second receivers, respectively; and operating means for obtaining a calibration factor for calibrating said second branch unit in accordance with a first received signal for calibrating, which is coupled to said second receiver by said first and third directional couplers when said first transmitter transmits the signal and a second received signal for calibrating, which is coupled to said first receiver by said second and third directional couplers when said second transmitter transmits the signal.

2. The antenna apparatus according to claim 1, wherein said operating means obtains a calibration factor to be applied to said second branch unit in accordance with a ratio between said first received signal and said second received signal using said first branch unit as a reference.

3. The antenna apparatus according to claim 1, wherein, in said third directional coupler, an attenuation rate in a case that the inputted signal of said first input terminal is sent to said second output terminal and an attenuation rate in a case that the inputted signal of said second input terminal is sent to said first output terminal are equally formed.

4. An antenna apparatus, comprising:

L-number branch units (wherein L=2 and L is an integer) having antenna elements, directional couplers and transmitters, wherein said directional couplers output the received signal from said antenna element to an output terminal during the reception, output the transmitting signal from said transmitter to said antenna element during a transmission, and provide feedback of the transmitting signal from said transmitter to said output terminal with a predetermined attenuation rate;

a plurality of directional couplers at a second layer, each of which is provided for each pair of said L-number branch units, wherein a first input terminal is connected to said directional coupler at an ith branch unit (wherein 1=i =L and i is an odd number), a second input terminal is connected to said directional coupler at an (i+1)th branch unit, an inputted signal from said first input terminal is sent to a first output terminal, an inputted signal from said second input terminal is coupled to a first output terminal with a predetermined attenuation rate, and said inputted signal from said second input terminal is sent to said second output terminal, and said inputted signal from said first input terminal is coupled to said second output terminal with a predetermined attenuation rate;

a plurality of directional couplers at a third layer, each of which is provided for a respective directional coupler at the second layer, wherein first and second input terminals are connected to a first output terminal or a second output terminal of the adjoining directional coupler at said second layer, and said first and second output terminals are connected to a receiver; and operating means for obtaining a calibration factor for said each branch unit in accordance with received signals of (i−1)th and (i+1)th receivers when a transmitter at said ith branch unit transmits a signal.

5. The antenna apparatus according to claim 4, wherein, said directional coupler at the third layer outputs the inputted signal of said first input terminal to said first output terminal, and couples said inputted signal to said second output terminal with a predetermined attenuation rate, outputs the inputted signal of said second input terminal to said second output terminal, and couples said inputted signal to said first output terminal with said predetermined attenuation rate.

6. The antenna apparatus according to claim 4, wherein, the received signal at said i-1th receiver is defined as $T_iR_{i-1}$ when the transmitter at said ith branch unit transmits a signal, and the received signal at said ith receiver is defined as $T_{i-1}R_i$ when the transmitter at said (i−1)th branch unit transmits a signal, and said operating means calculates a calibration factor $H_i$ at said ith branch unit on the basis of the first branch unit by the following equation:

$$H_i = T_1R_i/(T_iR_1) = T_1$$

$$R_2 \cdot T_2R_3 \ldots T_{i-1}R_i/T_2R_1 \cdot$$

$$T_3R_2 \ldots (T_iR_{i-1}).$$

* * * * *